Sept. 11, 1923.                                              1,467,508
                              C. SENG
                    INSTANTANEOUS PIPE COUPLING
                        Filed March 23, 1921
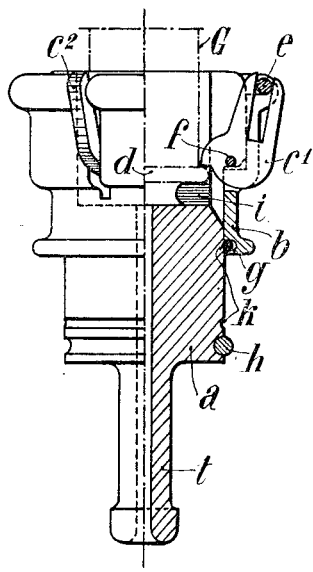
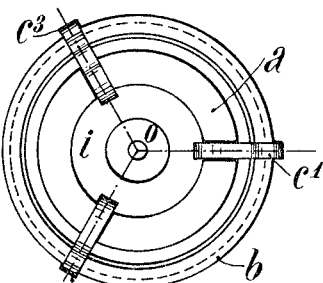
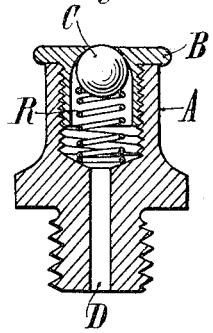 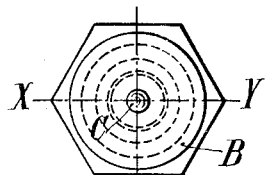
Inventor
C. Seng,
By Marks & Clerk
Attys.

Patented Sept. 11, 1923.

1,467,508

UNITED STATES PATENT OFFICE.

CAMILLE SENG, OF ROMILLY-SUR-SEINE, FRANCE, ASSIGNOR TO SOCIETY MEYREL FRERES, OF COLMAR, FRANCE.

INSTANTANEOUS PIPE COUPLING.

Application filed March 23, 1921. Serial No. 454,840.

(GRANTED UNDER THE PROVISIONS OF THE ACT OF MARCH 3, 1921, 41 STAT. L., 1313.)

*To all whom it may concern:*

Be it known that I, CAMILLE SENG, residing at Romilly-sur-Seine, Aube, France, have invented certain new and useful Improvements in an Instantaneous Pipe Coupling (for which I have filed applications in France, February 24, 1914; Great Britain, February 24, 1915; Switzerland, March 1, 1915, by assignee Meyrel; Switzerland, March 24, 1915; Belgium, May 6, 1915; Italy, May 12, 1915; Germany, October 9, 1919, by assignee Meyrel; Spain, June 20, 1920; Canada, July 8, 1920; Australia, July 8, 1920; India, July 12, 1920; Luxemburg, June 13, 1920; Netherlands, August 26, 1920; Hungary, March 31, 1921, by assignee Meyrel; Czechoslovakia, March 28, 1920, by assignee Meyrel; Norway, March 30, 1921, by assignee Meyrel; Sweden, March 30, 1921, by assignee Meyrel; Denmark, March 31, 1921, by assignee Meyrel; Austria, December 21, 1921, by assignee Meyrel), of which the following is a specification.

This invention relates to an instantaneous coupling device for pipe lines and more particularly for pipe lines for fluids under pressure; this coupling device is essentially characterized in that both parts of the coupling are connected or separated from each other by the longitudinal displacement, upon one of the said parts, of a controlling sleeve intended to operate levers, claws or other connecting members; these members engage or not with the other part of the coupling which, to this end, is provided with a connecting flange or the like means. The coupling may, more particularly, be constituted by a body comprising a chamber within which the other part of the coupling may be introduced, which rests or bears on a resilient packing ensuring fluid-tightness of the joint. The connection is effected by means of claws which project into the said chamber and are pivoted in slots formed in the coupling, the said claws being extended beyond their point of articulation by slotted arms which penetrate slots formed in the controlling ring or sleeve and are actuated by the latter by means of pins extending in the slots of the said arms.

This instantaneous coupling is more particularly applied in the case where it is desired to have forced lubrication with oil, grease, etc. In this case, the coupling which is connected to the piping of the delivery mechanism of a pump or the like may be secured as desired by the operation of the sleeve actuating the claws upon the connecting flange with which the lubricator must be provided for that purpose. This flange may be formed upon the cap which closes the lubricator and which comprises an opening constituting a seat for the obturator subjected to the action of an internal spring.

In the accompanying drawings and by way of example:

Fig. 1 shows partly in elevation and partly in vertical section a constructional form of the instantaneous coupling forming the subject matter of this invention.

Fig. 2 is a corresponding sectional plan thereof.

Figs. 3 and 4 show in vertical section taken on line X—Y and in plan, respectively, a constructional form of a ball closure lubricator which has been more particularly designed for use in conjunction with the instantaneous coupling in the case of forced lubrication.

The instantaneous coupling consists of two main parts: on the one hand, a body $a$ and, on the other hand, a controlling sleeve $b$ adapted to slide on the body $a$.

The body $a$ which constitutes a kind of cup adapted to receive the member on which the coupling is to be secured, is provided in the ledge enclosing the said cup with a number of slots respectively receiving levers $c^1$, $c^2$, $c^3$, constituting claws. These levers $c^1$, $c^2$, $c^3$, are pivoted on the body $a$ by means of a wire $f$ fitting in a groove suitably provided for that purpose. The levers $X^1$ enter also in corresponding slot $s$ formed in the sleeve $b$ which may be longitudinally moved relatively to the body $a$. Each lever is provided with a hook projecting in the cup of the body $a$, the other arm of the said lever constituting an operating fork. The operating forks are connected by a wire $e$ arranged in a groove of the movable sleeve $b$. In another groove of the latter is fitted another wire $g$ which can come in engagement during its displacements in one direction or the other, with slots $k$ formed in the body $a$, thus holding the said sleeve stationary in the extreme positions it may thus occupy. A wire $h$ serves moreover as an abutment.

A rubber ring $i$ is arranged at the bottom of the cup and serves as a bearing for the part G to be connected, the claws $c^1$, $c^2$, $c^3$ acting so as to press it on the said ring $i$ which is compressed and thus forms a fluid tight joint.

It will be seen that in the position illustrated in Fig. 1, the sleeve $b$ being pushed back on the body $a$ and towards the part G to be coupled, the claws $c^1$, $c^2$, $c^3$ project within the body $a$ and taking a bearing on the flange $d$ of the other part of the coupling G, press it on the inner rubber ring $i$. It will be noted that any traction exerted on the body $a$ cannot in any case determine the disconnection.

On the contrary, by drawing the sleeve $b$, the wire $e$ appertaining to the latter rocks the levers $c^1$, $c^2$, $c^3$ and permits the release of the previously coupled member G, the sleeve $b$ being held stationary in this position by the engagement of the wire $g$ in the corresponding groove $k$.

This instantaneous coupling, which may be used for ensuring the junction of two pipe lines wherein circulates any fluid and particularly any fluid under pressure, may be employed in particular when a forced lubrication is to be effected by oil or grease. For that purpose, use may be made of a ball closure lubricator acting as an obturator and provided with an outer flange for hooking and fixing the coupling (Figs. 1 and 2).

As illustrated in Figs 3 and 4, this lubricator is constituted by a hollow body A perforated with a channel D forming a duct for the lubricant. A threaded extension permits the placing in position of the lubricator. In the chamber formed in the body A, which is internally threaded, is screwed a plug B presenting the flange on which are secured the claws $c^1$, $c^2$, $c^3$ of the coupling (Figs. 1 and 2) for effecting the connection with the pump adapted to deliver the lubricant. In the example shown, the plug B is, moreover, internally recessed for receiving a ball $c$ which is constantly pressed by an internal spring R for closing the lubricator.

These arrangements allow, for instance, of mounting a pressure screw pump on the coupling forming the subject-matter of this invention and to instantaneously connect it to the lubricators, or lubricating axes for machines and particularly for motor vehicles. It permits of connecting pipes, one of which is provided with the coupling, whilst the other carries the coupling member, electric cables or the like, watering pipes, fire hose, pneumatic pumps to the valves of bicycles, motor cycles, motor cars, etc.

What I claim as my invention and desire to secure by Letters Patent is:

1. In a coupling for pipe lines, the combination with a cylindrical body member one end of which has a bore for receiving a male coupling member, the walls of said bore having a plurality of longitudinally extending slots formed therethrough, a lever pivotally mounted in each of said slots, the outer ends of said levers being slotted and the inner ends each having a hook for engaging the male coupling member, a sleeve slidably mounted on said body member and having slots registering with the slots in said wall, a pin in each of said sleeve slots sliding in the slot of the corresponding lever, and coacting means on said body member and sleeve for holding said sleeve in its retracted position.

2. In a coupling for pipe lines, the combination with a cylindrical body member having a bore for receiving a male coupling member, the walls of said bore having a plurality of longitudinally extending slots formed therein, a lever pivotally mounted in each of said slots, the inner ends of said levers each having a hook for engaging the male coupling member, and a sleeve slidably mounted on said body member, said sleeve having a pin connected with the outer ends of each of said levers.

3. In a coupling for pipe lines, the combination with a body member having a bore for receiving a male coupling of levers mounted on said body member for engaging the male coupling member, and a sleeve slidably mounted upon said body member and movable longitudinally thereof, said sleeve comprising means for engaging said levers and moving them to either of two different positions.

In testimony whereof I have signed my name to this specification.

CAMILLE SENG.